United States Patent [19]

Sanders

[11] Patent Number: 5,603,510
[45] Date of Patent: Feb. 18, 1997

[54] VARIABLE CLEARANCE SEAL ASSEMBLY

[76] Inventor: William P. Sanders, 188 Howland Ave., Toronto, Ontario, Canada, M5R 3B6

[21] Appl. No.: 425,676

[22] Filed: Apr. 18, 1995

Related U.S. Application Data

[63] Continuation of Ser. No. 255,104, Jun. 7, 1994, abandoned, which is a continuation of Ser. No. 118,141, Sep. 8, 1993, abandoned, which is a continuation of Ser. No. 985,747, Dec. 4, 1992, abandoned, which is a continuation of Ser. No. 714,488, Jun. 13, 1991, abandoned.

[51] Int. Cl.$^6$ .............................. F16J 15/48; F01D 5/20
[52] U.S. Cl. ............................. 277/53; 277/56; 277/14.9; 415/173.3
[58] Field of Search .......................... 277/53–57, 158, 277/1; 415/174.5, 173.3

[56] References Cited

U.S. PATENT DOCUMENTS

| 2,600,991 | 6/1952 | Hargrove | 277/56 X |
|---|---|---|---|
| 2,907,595 | 10/1959 | Benson et al. | 277/53 X |
| 3,594,010 | 7/1971 | Warth | 277/158 X |
| 3,623,736 | 11/1971 | Petrie et al. | |
| 3,860,358 | 1/1975 | Cavicchi et al. | |
| 4,043,714 | 8/1977 | Berkowitz | |
| 4,103,905 | 8/1978 | Desmond et al. | |
| 4,436,311 | 3/1984 | Brandon | |
| 4,469,017 | 9/1984 | Hanlon | |
| 4,485,620 | 12/1984 | Koenig et al. | |
| 4,574,591 | 3/1986 | Bertsch | |
| 5,002,288 | 3/1991 | Morrison et al. | 277/53 X |

FOREIGN PATENT DOCUMENTS

| 950524 | 10/1956 | Germany | 277/53 |
|---|---|---|---|
| 0152906 | 7/1986 | Japan | 415/173.3 |
| 1224234 | 3/1971 | United Kingdom. | |
| 2064016 | 11/1979 | United Kingdom. | |
| WO85/03991 | 3/1984 | WIPO. | |

OTHER PUBLICATIONS

"Improved Turbine Efficiency with Retractable Packing Rings" (Undated, but cited 1988 reference) by R. E. Brandon.

"Efficiency Audit of the Turbine Steam Path, Classifying Damage and Estimating Unit Losses" by W. P. Sanders (Mar. 1989).

"Sawyer's Turbo Machinery Maintenance Handbook" 1st Edition, vol. 2, Turbo Machinery International Publications (1980).

"Variable Clearance Packing", International Power Generation (Mar. 1990) by B. L. Morrison et al.

"Steam Turbine Operation", 6th Edition, Sir. Isaac Pitman & Sons Limited, London (1958) by W. J. Kearton.

"Steam Turbines", 3rd Edition, McGraw Hill Book Company, Inc. (1950) by E. F. Church.

*Primary Examiner*—Daniel G. DePumpo
*Attorney, Agent, or Firm*—Hopgood, Calimafde, Kalil & Judlowe

[57] ABSTRACT

This invention relates to an improved variable clearance, segmented seal ring assembly for preventing fluid flow between a stationary casing and a rotating shaft in a fluid dynamic system. The casing has a cavity for receiving and holding a portion of a seal ring segment. In the cavity, a helical spring biases the segment away from the casing and leaf springs bias the segment toward the casing so as to suspend the segment between the casing and the shaft. Advantageously, this assembly provides a seal between the shaft and casing which maintains system efficiency during normal operations by preventing damage during transient operations, i.e., minimum and maximum operating pressure conditions.

1 Claim, 1 Drawing Sheet

VARIABLE CLEARANCE SEAL ASSEMBLY

This application is a continuation of Ser. No. 08/255,104, Jun. 7, 1994, now abandoned, which is a continuation of Ser. No. 08/118,141, Sep. 8, 1993, now abandoned, which is a continuation of Ser. No. 07/985,747, Dec. 4, 1992 now abandoned, which is a continuation of Ser. No. 07/714,488, Jun. 13, 1991, now abandoned.

BACKGROUND OF THE INVENTION

The present invention relates to seals, and more particularly to an improved seal for use in fluid dynamic systems.

Efficient operation of pressurized fluid systems, e.g., turbines, compressors and pumps, requires that high and low pressure operations be separate from one another. This is particularly true at the junctures of stationary and moving parts.

Many sealing systems have been developed for this purpose. Labyrinth seals, for example, use a segmented seal ring between a rotating part, e.g., a shaft, and a stationary part, e.g., a turbine casing. The seal ring has a plurality of seal teeth for reducing the radial gap between the shaft and casing to several thousandths of an inch. The seal teeth commonly extend radially inward and are spaced axially at intervals along the seal ring. The teeth are disposed in opposition to alternating raised portions on the shaft circumference. This arrangement forms a tortuous pathway for fluid flow which effects a seal between the shaft and the casing, separating high and low pressure regions along the rotating shaft.

However, during system start-up or shut-down when thermal distortion, shaft bowing, and vibration are most common, the teeth and the shaft often contact one another causing wear and damage to the seal.

In an attempt to solve this problem, a segmented ring is used with S-shaped springs between ends of adjacent seal ring segments. The springs bias the segments radially outward during minimum load conditions, e.g, system start-up or shut-down, in an attempt to increase the teeth to shaft clearance, while decreasing the clearance at the maximum load conditions encountered during normal operations. A seal of this general configuration is shown, for example, in U.S. Pat. No. 4,436,311, issued to Brandon on Mar. 13, 1984, the disclosure of which is hereby incorporated by reference.

However, each seal ring segment is constrained by only one set of springs whereby failure of one spring results in loosening of the seal segment and, hence, failure of the entire seal ring during normal operations. Moreover, these segments are known to lock in an open position during minimum pressure operations.

SUMMARY OF THE INVENTION

In accordance with one aspect of the present invention, there is provided an improved variable clearance seal assembly for preventing fluid flow between rotating and stationary members in a fluid dynamic system, the assembly comprising a stationary casing, a rotating shaft relatively central to the casing, and a seal ring disposed therebetween. The seal ring comprises a plurality of seal segments, each having first biasing means for biasing the segment radially outwardly, and second biasing means for biasing the segment radially inwardly, the first biasing means urging the segment away from and to an increased clearance relative to the shaft and the second biasing means urging the segment toward a close operating tolerance with the shaft.

The present invention is directed to a seal assembly for preventing fluid flow between stationary and moving members in a fluid dynamic system, the assembly comprising:

a sealing element;

a first means for biasing said sealing element away from said stationary member; and a second means for biasing said sealing element toward said rotating member.

The present invention is further directed to a method for effecting a seal between stationary and moving members in a fluid dynamic system, the method comprising the steps of:

forming a cavity in said stationary member;

operatively securing a sealing element in said cavity and across said stationary and moving members;

biasing said sealing element away from said stationary member; and biasing said sealing element toward said stationary member such that said sealing element is suspended between said stationary and rotating members but not in contact with said rotating member.

Accordingly, it is an object of the present invention to provide a seal system with increased seal clearance during minimum pressure conditions, while maintaining a smaller, optimum clearance during normal and maximum pressure conditions.

Another object of the present invention is to provide a fail-safe seal system which permits continued operation at maximum seal efficiency with minimum damage to the seal and other system parts.

Still another object of the present invention is to provide a more efficient and economical fluid dynamic system.

The present invention will now be further described by reference to the following drawings which are not to be deemed limiting in any manner.

DETAILED DESCRIPTION OF PREFERRED EMBODIMENTS

Figure 1:
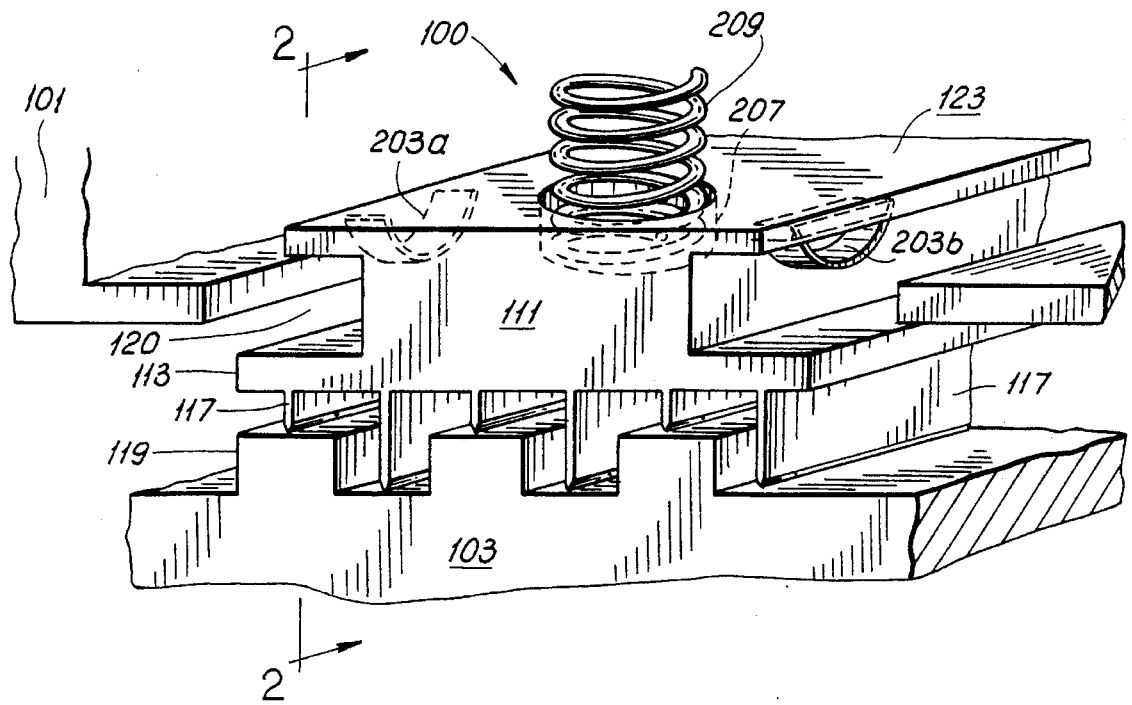
FIG. 1 is a perspective view of a seal assembly embodying the present invention.
Figure 2:
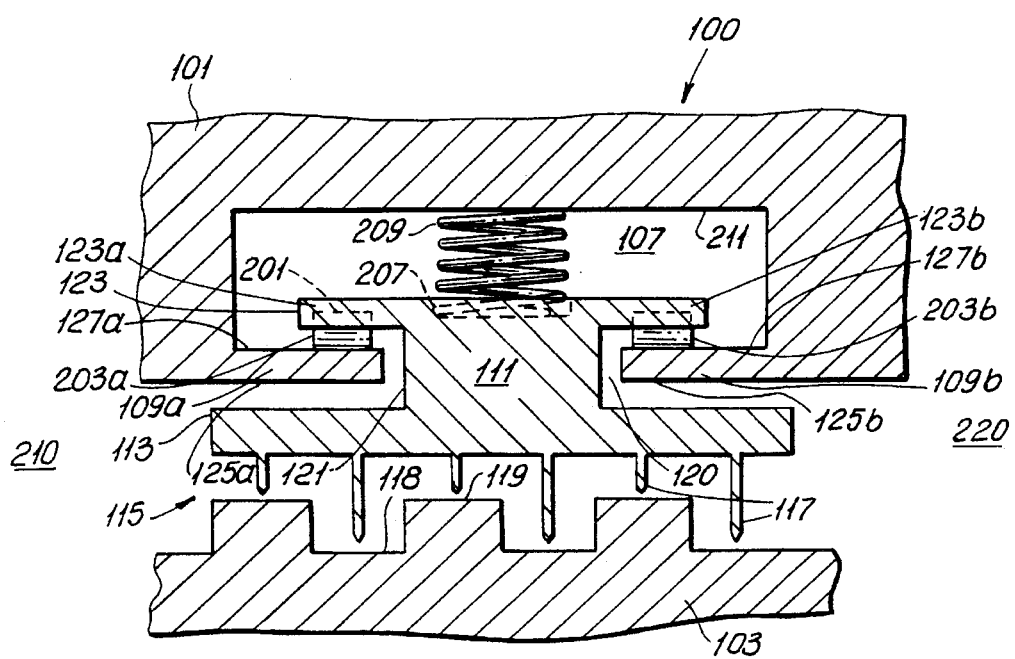
FIG. 2 is a sectional view of FIG. 1 taken along line 2—2.

FIGS. 1 and 2 illustrate a labyrinth type seal assembly 100 in accordance with one aspect of the present invention for use in a steam turbine. The seal assembly maintains pressure differentials along the length of a rotating turbine shaft 103 which passes through a stationary turbine casing or diaphragm 101. The assembly includes an arcuate gland or seal ring segment 111 having a helical spring 209, a pair of leaf springs 203a,b, and seal teeth 117.

A conventional turbine includes a rotor or shaft centrally located and housed within a stationary diaphragm which comprises two semicylindrical halves. Radially disposed blades are arranged about the diaphragm circumference for channeling a system fluid, e.g., steam, through the turbine. To effect rotation of the shaft, high pressure steam cascades through a series of stages at intervals along the shaft length. Each stage operates at a different pressure, the pressure differentials being maintained by interstage diaphragm seals which separate the various stages. A series of seal rings are typically used for this purpose.

The foregoing discussion is provided for purposes of illustration and is not to be deemed limiting as to the intended environment for use of the present invention. The remaining structural and functional aspects of the turbine are known by those skilled in the art and further description is believed unnecessary for illustration of the present invention.

Nestled between stationary diaphragm 101 and rotating shaft 103 is seal ring segment 111. Typically, a series of these arcuate seal ring segments, e.g., 4 or more per ring, surround the shaft so as to form a seal ring (not shown). Each segment has a generally "I" shaped cross-section with inner and outer rims or flanges 113 and 123, respectively. The inner flange preferably has a width greater than that of the outer flange to provide a suitable surface area for mounting seal teeth 117.

The outer or upper surface of outer flange 123 has a circular groove for receiving a helical spring 209. On the inward or lower surface of each flange shoulder 123a,b (at each corner of the seal ring segment) is a slot 201 for receiving a leaf spring 203a,b, respectively. Engagement of the slots with the leaf springs prevents shifting of the leaf spring and locking of the segment in an open position during operation.

As best seen in FIG. 1, each leaf spring comprises a thin strip of resilient, corrosion resistant material, e.g., a metal alloy, and is formed generally in the shape of a bow. When positioned in the slot, the leaf spring bows outwardly therefrom. As the system pressure builds, the shape of the leaf springs permits them to retreat into their respective slots until the flange shoulders and the diaphragm contact one another.

Each leaf spring is preferably held in the slot using a suitable fastener, e.g., a set screw, which allows ready installation, removal and adjustment of the spring.

Perpendicular to and extending downwardly from the inward or lower surface of inner flange 113 are alternating pairs of seal teeth 117, e.g., 3 pairs, one of each pair being generally half the length of the other. The shorter teeth are interposed with and in opposition to corresponding raised portions or castellations 119 spaced at intervals along surface 118 of shaft 103. In a like manner, the longer teeth correspond with spaces between the castellations on shaft surface 118. This arrangement of teeth and castellations forms a tortuous pathway for the flow of steam and, to a very close tolerance, effects a seal between the diaphragm and the shaft.

As best seen in FIG. 2, diaphragm 101 houses a seal receiving cavity 107 for operatively containing and holding the outer flange 123 of seal ring segment 111. An opening 120 in the cavity is defined by diaphragm shoulders 109a and 109b, respectively. The width of the opening is preferably substantially less than that of outer flange 123 so that the seal ring is held operatively in the diaphragm cavity.

Outer flange 123 is suspended between cavity upper and lower surfaces or walls 211, 127a,b, respectively, by helical spring 209 and leaf springs 203a,b. The helical spring engages the midsection of cavity upper wall 211, biasing segment 111 inwardly and away from the upper wall such that each leaf spring 203a,b contacts the respective cavity lower walls 127a,b. The leaf springs, in turn, bias the segment outwardly and against the helical spring in a direction generally away from the shaft. The springs are selected and calibrated so as to provide sufficient differential radial spring forces to suspend the outer flange of the segment between the upper and lower cavity walls during minimum and maximum operating conditions.

In an alternative embodiment of the present invention, the helical springs are disposed in pairs between the lower surfaces 125a,b of shoulders 127a,b, respectively, and the outward or upper surface of inner flange 113. In still another embodiment, the leaf spring receiving slots are formed in the cavity lower walls.

Preferably, the design tension of the helical spring (for closing the seal) is less than that of the leaf springs (for opening the seal) so that, during start-up or shut-down operations, the biasing forces of the leaf springs overcome those of the helical spring and operating pressures so as to keep the seal open to a maximum radial teeth to shaft clearance (maximum width of gap 115). It is also preferred that leaf springs are selected which exert greater forces during normal or maximum operating conditions than those of the helical spring so that the leaf springs will fail before the helical spring. This preference (known as the failure mode) insures that the seal will be held in a predetermined optimal design tolerance position by the helical spring, regardless of leaf spring failure. Moreover, the helical spring constrains the seal ring and prevents the seal from roaming about and damaging turbine parts.

While the present invention has been described as using a fixed cavity geometry with helical and leaf springs, it is understood that any resilient member and/or geometry could be used giving consideration to the purpose and environment for which the present invention is intended. For example, it is preferable that the geometry of the seal ring segments and the arrangement of leaf springs be suitable to prevent a torque from developing about the seal ring. In addition, springs are selected according to the desired manufacturing specifications and design criteria, their cross-section and material determining the potential energies (tensions) necessary for achieving the objectives of the present invention.

Maximum clearance of the seal teeth from the shaft occurs during minimum pressure conditions, e.g, during system start-up or shut-down. Under these conditions, the leaf springs bias the sealing ring segments generally outward (toward the cavity upper wall 211) such that the upper surface of inner flange 113 contacts lower shoulder surfaces 125a,b. This results in maximum clearance between the seal teeth and the shaft, thereby diminishing the likelihood of damage to the seal due to rubbing and vibration. Typically, about 125 mils additional clearance is achieved.

As steam is continually introduced into the turbine, however, the operating pressure in high pressure region 210 builds creating an inwardly acting force which ultimately biases the segment inward toward the shaft. When the summation of the inwardly directed forces due to the high steam pressure and the helical spring overcome the outwardly directed forces of the leaf springs, the seal teeth are biased (closed) to a minimum clearance (known as the design clearance) from the shaft. This typically occurs beyond a predetermined design pressure range. The resulting clearance is then maintained throughout the design pressure range up through the maximum system operating pressure.

Outing other minimum pressure conditions, e.g., turbine shut-down, the process operates in reverse: as the steam pressure decreases, the outwardly directed forces of the leaf springs eventually overcome the combined inwardly directed forces of the steam pressure and the helical spring causing the seal to open automatically (move outwardly), increasing the teeth to shaft clearance. This generally occurs once the operating pressure falls below a selected threshold design pressure.

This interplay between the forces of the helical spring, the operating pressure, and the leaf springs insures that the seal teeth will remain clear of the shaft surface, including the castellations, throughout operation of the system, in particular, during system start-up and shut-down.

Accordingly, whether operating at minimum or maximum pressure conditions, this novel seal assembly advantageously maintains a seal without contact between the shaft and diaphragm, while maintaining seal efficiency without degradation. A large clearance during the initial start-up period (acceleration) and system shut-down (deceleration) avoids rubbing between the shaft and the seal due to thermal distortion, bowed rotors and vibration. This results in substantial reductions in the magnitude and likelihood of seal damage as well as maintained turbine efficiency.

Although the embodiments illustrated herein have been described for use with a labyrinth seal in a steam turbine, their adaptation to any device and fluid dynamic system, e.g., compressors or pumps, where seals may be needed is understood giving consideration to the purpose for which the present invention is intended.

Since from the foregoing the construction and advantages of the present invention may be readily understood, further explanation is believed unnecessary. However, since numerous modifications will readily occur to those skilled in the art after consideration of the foregoing specification and accompanying drawings, it is not intended that the invention be limited to the exact construction shown and described, but rather all suitable modifications and equivalents may be resorted to which fall within the scope of the appended claims.

What is claimed is:

1. A seal assembly for preventing fluid flow between stationary and moving members in a fluid dynamic system, the assembly comprising:

a sealing assembly between said stationary and moving members;

a first means for biasing said sealing element away from said stationary member, said first means including a single, constant force helical spring located centrally to the sealing element;

a second means for biasing said sealing element toward said moving member to the extent that said sealing element is suspended between said stationary and moving members but not in contact with said moving member, said second means including a leaf spring having a design tension greater than that of the helical spring so that, during start-up or shut-down operations, the biasing forces of said leaf spring overcomes those of said helical spring and operating pressure so as to keep a maximum radial clearance between the sealing element and shaft; and an outer flange having inner and outer surfaces, said outer surface having a groove for receiving said helical spring so as to constrain the seal element, and said inner surface having a slot for receiving said leaf spring such that upon engagement of said slot with said leaf spring, shifting of the left spring and locking of the assembly in an open position during operation is prevented.

* * * * *